June 9, 1931.  L. W. JONES  1,809,516
STOCK AND DIE
Filed Jan. 20, 1930
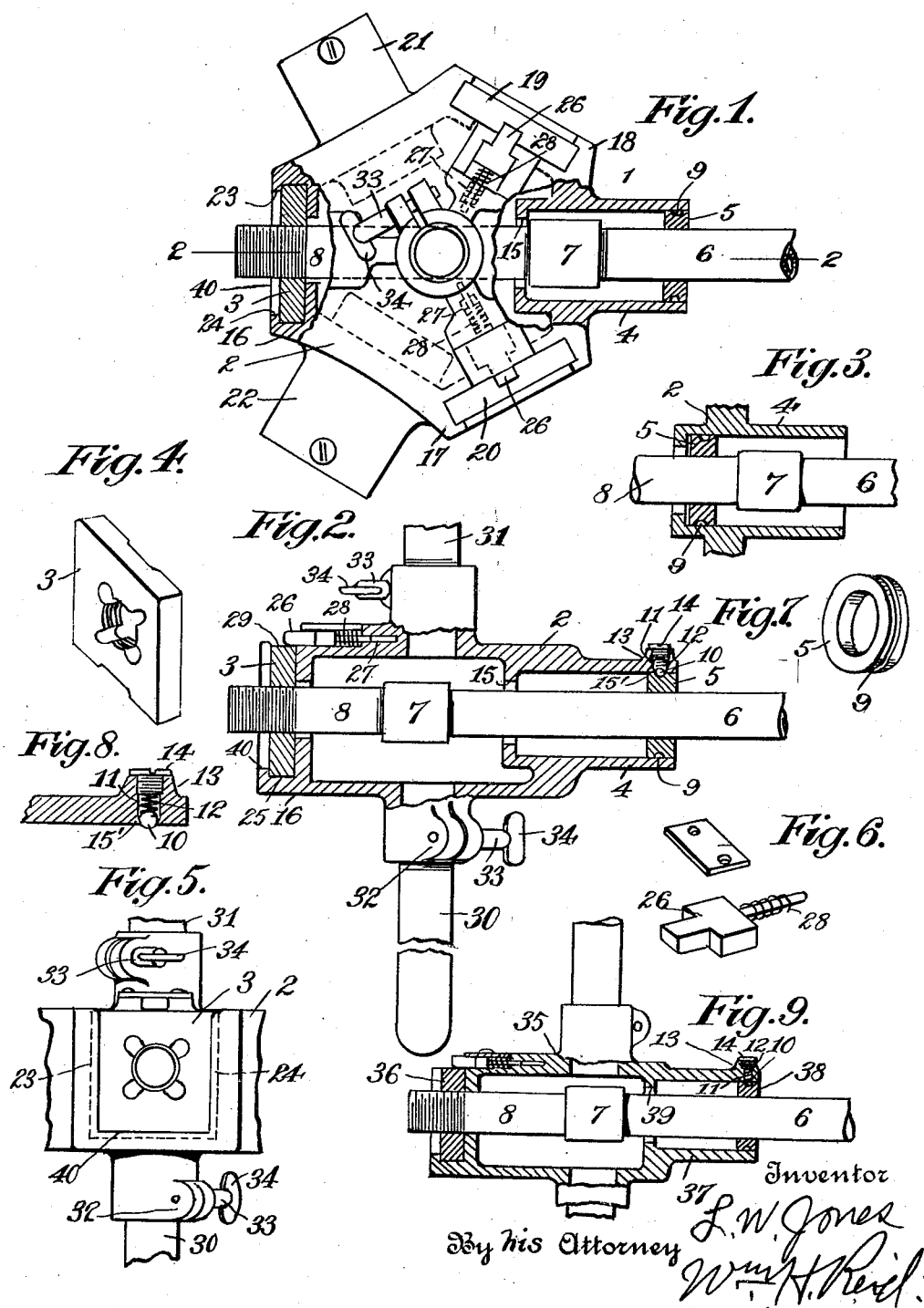

Patented June 9, 1931

1,809,516

UNITED STATES PATENT OFFICE

LOUIS W. JONES, OF NEW YORK, N. Y.

STOCK AND DIE

Application filed January 20, 1930. Serial No. 421,978.

This invention relates to devices for cutting screw threads on pipes or similar structures, and which are usually termed a stock and die. In most of the forms in use the stock is of multiple arrangement, adapted to cut several different sized pipe threads at different places, which can quickly operate on different size pipes; but the invention also applies to a stock and die that is of single arrangement, to cut one size of pipe, and by substitution of the dies or cutters, other sizes of pipe can be accommodated.

The object of the present invention is to provide a stock and die with means whereby it will operate on a single piece of pipe to cut a thread on the end, and also by a very simple attachment it will readily operate to cut a thread on a short piece of pipe, termed a nipple in this art, which nipple is connected with the main piece of pipe by a coupling. Devices of this character will have the die plate, or similar member such as two or more cutting jaws or chasers, arranged at one portion of the stock, and at the opposite portion is arranged a suitable guide of tubular form through which the pipe to be threaded is advanced. Obviously this guide is of a size slightly larger than the pipe that it guides, as fed into the die, and the coupling if carried by such pipe, could not pass through this guide. The present invention provides a guide of an enlarged size, to permit insertion of the pipe and coupling by which the nipple is attached, and a supplementary tubular member in the nature of a bushing or ring, is slidably mounted in this guide member, and is caused to support the pipe beyond the coupling, if the nipple is comparatively short; and if the nipple is of greater length, this bushing can be advanced in the elongated guide, to engage the nipple.

In the accompanying drawings showing embodiments of my invention:

Fig. 1 is a face view partly in section.

Fig. 2 is a section on the line 2—2 of Fig. 1.

Fig. 3 is a detailed section of one of the guide portions.

Fig. 4 shows a die plate.

Fig. 5 is a face view of one of the die plates showing its mounting.

Fig. 6 shows a detail of the die plate mounting.

Fig. 7 shows the slidable guide bushing.

Fig. 8 shows a bushing retainer.

Fig. 9 shows another form of stock.

As shown in the drawings, the frame 2 of the stock is provided at several places not diametrically opposite, with openings arranged to receive the thread cutters, preferably in the form of a die plate 3, see Fig. 4, that are detachably mounted at these positions by suitable means. Opposite each of the die plates 3 is arranged a socket portion, shown in the form of an elongated sleeve 4, that is preferably integral with the frame 2, which in such structures may be a casting. This sleeve or tube is in axial alignment with the opposite die plate, but its bore is somewhat larger than the pipe that it is intended to guide into the die plate to be threaded therein. In the bore of this sleeve 4, slides a bushing 5, see Fig. 7, whose bore is of a size to receive and guide the pipe 6 to be threaded by the opposite die plate 3. This bushing is arranged to slide freely in the elongated sleeve 4, and may have means for retaining it in the outermost position in the sleeve, so that it can be normally retained therein, but advanced into the sleeve when desired, or removed from the sleeve.

In this art, it is frequently necessary to employ short pieces of pipe that are termed nipples. Usually these are furnished of different lengths and previously threaded on each end so that when a certain fitting must be made the proper length of nipple will be available. A length of pipe is first threaded and then the pipe is cut off the desired length, and the nipple must be threaded at the other end. The long piece of pipe 6 that is threaded, and the nipple 8 just formed that is threaded at one end, are then screwed into a coupling 7. It is then in order to pass this nipple and coupling into the die stock to thread the other end of the nipple. With the present construction of stock devices the bushing opposite the die plate, if employed is not shiftable to be brought inwardly toward the center of the stock, or to slide along an elongated sleeve, but unless attached would slip off of the sleeve and the pipe would not be guided to cut a proper thread. In the present invention we first remove the bushing 5 and insert the coupling and nipple, and then the bushing is passed over the pipe 6 from the other end and, brought up around the pipe into the sleeve 4, as indicated in Fig. 1. It will be observed that the coupling 7 here, that connects the pipe 6 with the nipple 8 will have the coupling inside of the sleeve 4, and the bushing 5 can now guide the pipe 6. As stated, means are preferably provided for detachably retaining the bushing 5 in the sleeve 4, and as shown, the bushing is provided with a peripheral groove 9 adapted to engage a ball 10 that is pressed outwardly in a bore 11 by a coil spring 12, this bore being arranged in a boss 13 on the sleeve 4, see Fig. 8, and the spring is compressed by a screw 14, closing the bore 11. When the ring is inserted, it will engage the ball 10 that is permitted to project a short distance into the bore of the sleeve 4, by an inwardly extending flange 15 at the bottom of the bore, and the ball will be pressed inwardly against the tension of the spring, until the groove in the ring reaches the ball, that will be pressed inwardly into this groove and serve to retain the bushing in this position, as indicated in Figs. 1 and 2.

Where the nipple is comparatively short as indicated at 8 in Fig. 2, the bushing 5 can be advanced into the sleeve 4 so that it is nearer to the die plate, and need not be retained in the outer portion by the ball and spring. In this connection it is desirable to provide means to prevent this bushing from moving too far inwardly, and I provide a stop at the inner end of the sleeve 4, that may be in the form of a flange 15 that will engage the bushing; but the inner diameter of this flange is greater than the outer diameter of the coupling 7 so that the latter can pass freely through and reach the position shown in Fig. 2. It will be understood that the bore of the sleeve 4 is made sufficiently large to accommodate the bushing 5, and the latter has its bore arranged to guide the pipe 6, and the flange 15 will limit the advance of the bushing, yet not prevent passage of the coupling 7.

It will be understood that the die stock shown in Fig. 1 is provided with three socket portions 16, 17 and 18, to accommodate three short die plates, 3, 19 and 20, that are of three different sizes. In this art they are frequently arranged to thread pipes of half inch, three-quarter inch and one inch sizes. Opposite the other two dies 19 and 20 are arranged sleeves 21 and 22 respectively. The latter identical with the sleeve 4 and co-operating bushing 5, but which are of correspondingly changed diameters and sizes to accommodate the other two sizes of pipes respectively. It will be further understood that these three sleeves are located intermediate of the three die members and will not interfere with the functions of the others.

In Fig. 5 the die plate 3 is shown as mounted in a groove portion in the sockets, and it is preferably arranged to slide in and out, without the usual arrangement of an outer plate that is fastened by screws to hold the die plate in position. The socket portion is provided with opposite grooves 23 and 24 into which the plate 3 is caused to slide from one side, until its entering edge engages the wall 25 of the frame, that it will strike when the die is in the proper axial position in the frame, and be held by a ledge 40 on the frame. Means are further provided to retain the die plate in this position, and as shown a kind of latch or plunger 26, slides in a bore 27 in a frame, see Fig. 2, and is pressed outwardly by a coil spring 28 to move over the outer edge 29 of the die plate 3. It will be understood that this plunger is pushed inwardly when the die plate is inserted until its lower edge strikes the abutment wall 25, when the plunger will be free to be moved outwardly by the spring, and brought across the outer edge of the die plate to retain it in this position.

Devices of this character are provided with means on opposite sides of the frame to receive handle bars, such as 30 and 31, that for convenience are detachable. These handle bars heretofore have been usually screw-threaded to screw into threaded socket portions in the opposite faces. In the present invention I provide a split sleeve 32, that receives a bolt 33 that may have a wing head 34. The bar is simply inserted and then the bolt tightened that will securely hold the handle bar in position.

In Fig. 9 is shown a die stock in which a single die plate only, is used. Here the stock 35 having the die plate 36 is provided with a sleeve 37 similar to the sleeve 4, that has a bushing 38 slidable therein and retained in outer position by the means as set forth, and the sleeve may be provided with a retaining flange 39 at its inner portion. It will be understood that this sleeve arrangement with the slidable bushing will operate identical with that set forth in the other views.

What I claim is:

1. A die stock adapted to receive pipe sections and a coupling connecting the sections and including a hollow body having an apertured closure at one side thereof, a die holder external to said closure, a diaphragm intermediate the sides of said body and having an aperture of sufficient size to permit passage of a pipe coupling, the body externally of the diaphragm consisting of a bushing guide of considerably greater length than the length of a pipe coupling, and an annular bushing slidable in said guide from one end to the other thereof to take position at either end of the guide said bushing being of uniform external diameter throughout its length and being of considerably less length than the bushing guide whereby the bushing may rest against the diaphragm and provide space on the outer side of the bushing within the bushing guide for a coupling.

2. A die stock adapted to receive pipe sections and a coupling connecting the sections and including a hollow body having an apertured closure at one side thereof, a die holder external to said closure, a diaphragm intermediate the sides of said body and having an aperture of sufficient size to permit passage of a pipe coupling, the body externally of the diaphragm consisting of a bushing guide of considerably greater length than the length of a pipe coupling, an annular bushing slidable in said guide from one end to the other thereof to take position at either end of the guide, and means to hold the bushing releasably in said guide said bushing being of uniform external diameter throughout its length and being of considerably less length than the bushing guide whereby the bushing may rest against the diaphragm and provide space on the outer side of the bushing within the bushing guide for a coupling.

3. A die stock adapted to receive pipe sections and a coupling connecting the sections and including a hollow body having an apertured closure at one side thereof, a die holder external to said closure, a diaphragm intermediate the sides of said body and having an aperture of sufficient size to permit passage of a pipe coupling, the body externally of the diaphragm consisting of a bushing guide of considerably greater length than the length of a pipe coupling, and an annular bushing slidable in said guide from one end to the other thereof to take position at either end of the guide, said bushing guide and bushing being of greater diameter than the aperture of the diaphragm whereby the diaphragm constitutes a stop for limiting inward movement of the bushing.

4. A die stock adapted to receive pipe sections and a coupling connecting the sections and including a hollow body having an apertured closure at one side thereof, a die holder external to said closure, a diaphragm intermediate the sides of said body and having an aperture of sufficient size to permit passage of a pipe coupling, the body externally of the diaphragm consisting of a bushing guide of considerably greater length than the length of a pipe coupling, an annular bushing slidable in said guide from one end to the other thereof to take position at either end of the guide, said bushing guide and bushing being of greater diameter than the aperture of the diaphragm whereby the diaphragm constitutes a stop for limiting inward movement of the bushing, and means to hold the bushing releasably in said guide.

5. In a die stock of the class described, a body having a bushing guide at one side thereof, said body having a diaphragm extending across the inner end of the bushing guide and provided with an opening of less diameter than the bushing guide, a bushing of less length than the bushing guide and slidable in the guide to rest against and be stopped by said diaphragm, said body having a wall opposite said diaphragm provided with an opening alined with the first opening, and a die holder on said body axially alined with said openings.

Signed at New York city, N. Y., on January 11, 1930.

LOUIS W. JONES.